C. S. PRESTON.
VEHICLE TIRE.
APPLICATION FILED MAY 18, 1921.

1,409,774.

Patented Mar. 14, 1922.
2 SHEETS—SHEET 1.

Inventor
C. S. Preston
By
Attorney

UNITED STATES PATENT OFFICE.

CLARENCE S. PRESTON, OF SAN DIEGO, CALIFORNIA.

VEHICLE TIRE.

1,409,774. Specification of Letters Patent. Patented Mar. 14, 1922.

Application filed May 18, 1921. Serial No. 470,561.

*To all whom it may concern:*

Be it known that I, CLARENCE S. PRESTON, a citizen of the United States, residing at San Diego, in the county of San Diego and State of California, have invented certain new and useful Improvements in Vehicle Tires; and I do hereby declare the following to be a full, clear, and exact description of the invention, such as will enable others skilled in the art to which it appertains to make and use the same.

This invention relates to vehicle tires of the solid type, adapted more particularly for trucks, delivery vehicles or other vehicles in which a comparatively heavy load is to be carried.

The principal object of my invention is to provide a tire of the solid type (as distinguished from a pneumatic tire) with interior suspensory annular elastic fins or webs divergent from an annular supporting rib or base of any suitable material, and suitably placed voids, whereby said fins or webs will be placed under tension and the solid portions of the tire forced into said voids when the tire is subjected to pressure of a load or to road shock, thereby taking up or absorbing shock and preventing jar and jolt from being communicated to the body of the vehicle.

Another object is to increase the resilience of the solid type of tire by providing for interior displacement of the solid material in connection with a central solid supporting rib of the same material as the tire or other suitable material for placing certain interior portions of the elastic material of the tire under tension for absorbing road shock.

The matter constituting my invention will be defined in the claims.

I will now describe my invention in detail by reference to the accompanying drawings, in which:

Fig. 3 represents a section on line 3—3, Fig. 1, showing a segmental portion of a tire.

Fig. 4 represents a transverse section of modified construction of my truck tire, adapted for a wider or larger tire.

The tire A is made with a solid body A' of rubber compound or other resilient material, and may be molded in the desired form with the interior annular voids described below. The body A' is made with a tread portion $a$, and with annular beads $a'$ at each side of the base H. The tire, Fig. 1, will preferably be reinforced with strong fabric imbedded in the rubber compound, as indicated by M, for giving such portions the required strength and durability.

Figure 1:
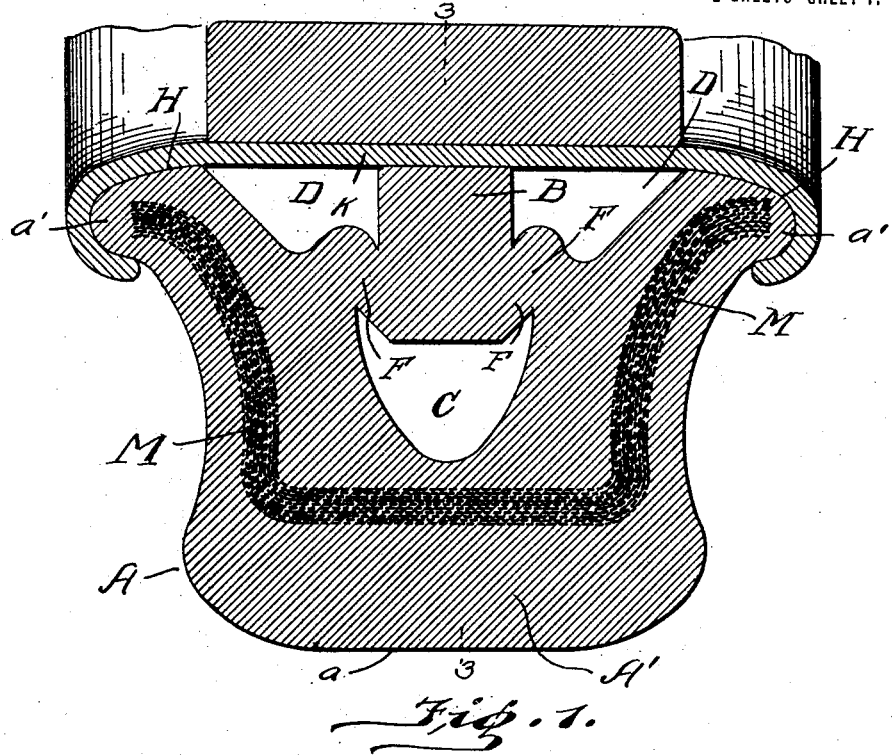
Figure 1 represents a transverse section of a tire embodying my invention.

When molding the tire Fig. 1, I form by a suitable core the central interior void or space C relatively nearer the base H and the voids D D opening directly into the base. The annular supporting rib B is located centrally at the base and may be an integral part of the rubber compound body A', as shown in Fig. 1, or may be a separate part B', composed of any suitable material, as wood or rubber compound, secured, if desired, to the rim K. This rib will bear centrally on a portion of the body directly inside of the central void C. When the tire is constructed as shown in Fig. 1 elastic fins or connecting webs F F are provided on each side of the rib B, which serve to suspend the tread portion of the tire on the rib B, and such web portions are placed under tension by a load or road shock. The effect of this will be to push solid material radially outward into the void C, and other portions of the solid material inwardly on each side of the rib into the voids D D. The web portions F F will thus act in a suspensory manner for the tread portion and will be placed under tension by load or road shock, thereby greatly increasing the resilience of the tire.

Figure 2:
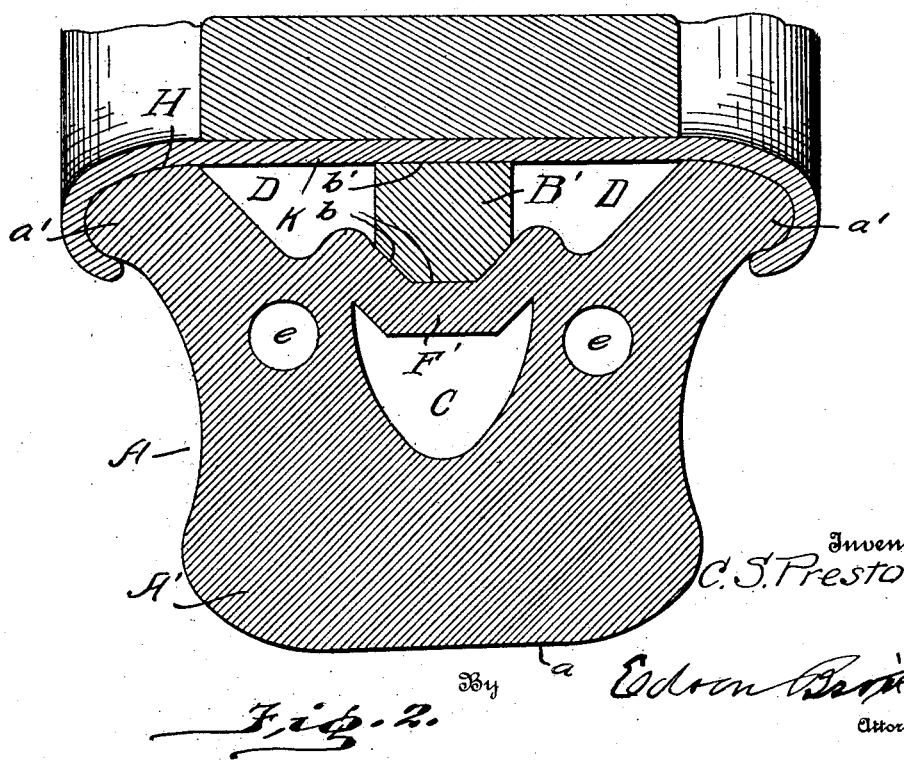
Fig. 2 represents a similar view, showing modifications in construction.

In case the rib B' is made of a separate part, as shown in Fig. 2, it is preferably made with a transversely curved or polygonal faced outer periphery $b$, and a flat inner peripheral face $b'$. In this modified construction of tire the fins F, Fig. 1, will be joined to form an annular saddle portion F', adapted to ride on the rib B', as indicated in Fig. 2. The side portions of this saddle will be placed under tension and will suspend the solid tread portion of the tire and impart resilience to the structure, as above described with reference to Fig. 1. The smaller voids $e$ $e$, circular in cross section, may also be molded in the solid material, as shown in Fig. 2, but such voids are not essential to the effective functioning of the parts previously described, but may be used in large tires or in tires which are not to sustain heavy loads or severe road shocks.

The inner voids D D are also useful in that they permit the beads a', a' to be pressed and contracted toward the rib B, so that said beads may be inserted in the grooves or recesses of the rim K.

In case an extra wide, large tire is required for a heavy truck I may construct it as shown in Fig. 4, in which the tire A² is molded with a body A³ having a tread a'', and at its base H', annular beads a'. By means of suitable cores a pair of annular voids C', C', relatively near the base H', are formed, being spaced apart to leave between them a central annular load sustaining rib L. At the base H' I provide two annular supporting ribs B² B² projecting respectively into the voids C', C' and connecting at the outer edges or faces by lateral fins or webs F² with the solid side and base portions of the tire and with the inner edge of the central rib L. The webs F² are arranged in divergent or oblique positions with reference to the ribs B² and are, therefore, put under longitudinal strain or tension under a load or road shock, that is, strain and tension in the direction of their long axes. In connection with the ribs B² they serve as bridges or saddles and act to suspend the load and prevent side bulge of the tire. Under these conditions the supporting ribs B² will apparently be forced outwardly into the voids C' at the part of the tread in contact with the road surface at any given time, and the portion or rib L and the side portions of the tire near the base will be forced inwardly into the base voids D'. The webs F shown in Figs. 1 and 2 also diverge inwardly and act to suspend the load.

As described with reference to Fig. 2, the ribs may be made separate from the body portion A³ of the tire and secured to the rim K in any desired manner, or they be made integral with said body A³. In case the ribs B² are made separate, the webs F² will be joined and ride on the outer peripheral edges or faces of the ribs B² and on the inner peripheral edge of the rib L.

The number of ribs B² and ribs L, and webs F², and consequently the number of voids C', may be increased to meet the requirements, according to the width of tire which must be provided.

The tire, as above constructed, may be secured to the rim in a variety of ways, as by a clencher rim K. The base of the tire may also be vulcanized to an iron or steel rim by a hydraulic pressure process now in use for fastening solid tires to wheel rims. I do not wish to be limited to any particular means or method of fastening my tire to a wheel rim, but shall use means which may be found most effective for such purpose.

Having described my invention, what I claim and desire to secure by Letters Patent is:

1. A vehicle tire comprising a body of resilient material containing an annular void, an annular solid rib adjacent to the base or inner periphery and adapted to project into said void, under a load or road shock and webs of elastic material diverging obliquely inwardly, one on each side of said rib, and connecting with the solid material of the tire, whereby, under load or road shock, said webs will be placed under tension and act to suspend the load and to push solid material into said void for increasing the resilience of the tire.

2. A vehicle tire of the solid type, comprising a body of resilient material having a plurality of annular voids therein, annular solid ribs adjacent to the base or inner periphery and adapted to project into said voids, and lateral divergent, suspending webs of elastic material one on each side of each rib, whereby under load or road shock said webs will be placed under tension and act to suspend the load and to push solid material into said voids for increasing the resilience of the tire.

3. A vehicle tire of the solid type, comprising a body of resilient material having a plurality of annular voids therein, annular solid ribs adjacent to the base or inner periphery and adapted to project into said voids, and lateral suspending webs of elastic material, one on each side of each rib, and a plurality of annular voids at the base, one on each side of said ribs, whereby under load or road shock said webs will be placed under tension and solid material be pushed into said voids at the base for increasing the resilience of the tire.

In testimony whereof, I affix my signature.

CLARENCE S. PRESTON.